(12) United States Patent
Stewart

(10) Patent No.: US 7,991,521 B2
(45) Date of Patent: Aug. 2, 2011

(54) VARIABLE PATH AUTOMATED GUIDED VEHICLE

(75) Inventor: Brian G. Stewart, Beverly Hills, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 1219 days.

(21) Appl. No.: 11/669,612

(22) Filed: Jan. 31, 2007

(65) Prior Publication Data

US 2007/0179690 A1  Aug. 2, 2007

Related U.S. Application Data

(60) Provisional application No. 60/764,094, filed on Feb. 1, 2006.

(51) Int. Cl.
*G05D 1/00* (2006.01)
*G01C 22/00* (2006.01)

(52) U.S. Cl. .......... 701/23; 180/170; 280/5.508

(58) Field of Classification Search .......... 701/23–25, 701/41, 200; 180/411, 6.2, 7, 168, 7.1, 170, 180/167; 700/248; 318/587; 280/5.508; 348/113

See application file for complete search history.

(56) References Cited

U.S. PATENT DOCUMENTS

| 3,759,187 | A | * | 9/1973 | Gayot | 104/130.07 |
|---|---|---|---|---|---|
| 3,950,811 | A | * | 4/1976 | Larson | 15/52.1 |
| 4,327,666 | A | * | 5/1982 | Lee | 118/679 |
| 4,530,056 | A | * | 7/1985 | MacKinnon et al. | 701/25 |
| 4,701,093 | A | * | 10/1987 | Meyer | 414/312 |
| 4,790,402 | A | | 12/1988 | Field et al. | |
| 4,821,191 | A | * | 4/1989 | Ikemoto et al. | 701/38 |
| 4,846,297 | A | | 7/1989 | Field et al. | |
| 4,847,769 | A | * | 7/1989 | Reeve | 701/23 |
| 4,922,428 | A | * | 5/1990 | Takahashi | 701/94 |
| 4,926,103 | A | | 5/1990 | Summerville et al. | |
| 4,990,841 | A | | 2/1991 | Elder | |
| 5,111,401 | A | | 5/1992 | Everett, Jr. et al. | |
| 5,210,473 | A | * | 5/1993 | Backstrand | 318/99 |
| 5,267,466 | A | * | 12/1993 | Morris | 73/1.81 |
| 5,280,431 | A | * | 1/1994 | Summerville et al. | 701/24 |
| 5,287,277 | A | * | 2/1994 | Mine et al. | 701/37 |
| 5,434,781 | A | | 7/1995 | Alofs et al. | |
| 5,456,332 | A | * | 10/1995 | Borenstein | 180/167 |
| 5,781,870 | A | * | 7/1998 | Okawa | 701/25 |

(Continued)

FOREIGN PATENT DOCUMENTS

JP       60-235652    * 10/1985

(Continued)

OTHER PUBLICATIONS

Simulating the Operational Control of Free Ranging AGVs by MB Duinkerken—2006, from  ;portal.acm.org/ft_gateway.cfm?id=1218387&type=pdf.*

(Continued)

*Primary Examiner* — Cuong H Nguyen
(74) *Attorney, Agent, or Firm* — Dickinson Wright PLLC

(57) ABSTRACT

An automated guided vehicle and a method of controlling an automated guided vehicle which are capable of varying the travel path of the automatic guided vehicle in order to reduce wear patterns created in the floor of the material handling facility. The travel path of the AGV is varied by intentionally applying a deviation from a selected predetermined route along which the AGV is traveling.

6 Claims, 7 Drawing Sheets

U.S. PATENT DOCUMENTS

| | | | |
|---|---|---|---|
| 5,999,865 | A | 12/1999 | Bloomquist et al. |
| 6,092,010 | A | 7/2000 | Alofs et al. |
| 6,161,845 | A * | 12/2000 | Shono et al. .................. 280/6.15 |
| 6,442,456 | B2 * | 8/2002 | Burns et al. ...................... 701/23 |
| 6,470,250 | B2 * | 10/2002 | Nishizaki et al. ............... 701/48 |
| 6,882,910 | B2 | 4/2005 | Jeong |
| 6,904,343 | B2 | 6/2005 | Kang |
| 6,941,200 | B2 | 9/2005 | Sonoyama et al. |
| 7,290,308 | B2 * | 11/2007 | Downey et al. .................. 15/359 |
| 2001/0021888 | A1 * | 9/2001 | Burns et al. ...................... 701/23 |
| 2001/0056317 | A1 * | 12/2001 | Nishizaki et al. ............... 701/48 |
| 2003/0053892 | A1 * | 3/2003 | Lan et al. ....................... 414/217 |
| 2005/0021195 | A1 | 1/2005 | Zeitler et al. |
| 2005/0216182 | A1 | 9/2005 | Hussain et al. |
| 2007/0080779 | A1 * | 4/2007 | Tang et al. .................... 340/5.61 |
| 2007/0179658 | A1 * | 8/2007 | Hamada ......................... 700/121 |
| 2007/0179690 | A1 * | 8/2007 | Stewart ............................ 701/23 |
| 2008/0009985 | A1 * | 1/2008 | Plishner .......................... 701/23 |
| 2008/0093742 | A1 * | 4/2008 | Walker .......................... 257/758 |
| 2008/0127467 | A1 * | 6/2008 | Hirano et al. ................. 29/25.01 |
| 2009/0138151 | A1 * | 5/2009 | Smid et al. ....................... 701/27 |
| 2009/0276111 | A1 * | 11/2009 | Wang et al. ...................... 701/23 |

FOREIGN PATENT DOCUMENTS

| | | | |
|---|---|---|---|
| JP | 61-294418 | * | 12/1986 |
| JP | 62159205 A | * | 7/1987 |
| JP | 1-25300 | * | 2/1989 |
| JP | 9-279187 | * | 10/1997 |
| JP | 2000-186381 | | 6/2000 |
| JP | 2004165239 A | * | 6/2004 |
| JP | 2004280296 A | * | 10/2004 |
| JP | 2009143716 A | * | 7/2009 |
| JP | 2009146322 A | * | 7/2009 |

OTHER PUBLICATIONS

On-line position recognition for autonomous AGV navigational systems, Z. Katz and J. Asbury;University of Natal, Durban, South Africa;Available online Feb. 12, 2003; Journal of Manufacturing Systems vol. 12, Issue 2, 1993, pp. 146-152.*

Integrated design of an AGV for improved GPS-based path-following performance, by Mathieu Joerger et al., International Journal of Vehicle Design; Issue: vol. 42, No. 3-4 / 2006; pp. 263-286.*

S Butdee, Control and path prediction of an Automate Guided Vehicle; from http://www.journalamme.org/papers_vol31_2/31241.pdf.*

PCT/JP05/18283 PCKC, Oct. 2004, Japan, Hirano et al.*

Are AGVs set to follow the robotics growth path?; Journal: Industrial Robot: An International Journal, 1986 , vol. 13, Issue:2 p. 86-91 ISSN: 0143-991X DOI: 10.1108/eb004944 Publisher: MCB UP Ltd.*

Effective Real-Time Wireless Control of an Autonomous Guided Vehicle; Lozoya, C.; Marti, P.; Velasco, M.; Fuertes, J.M.; Industrial Electronics, 2007. ISIE 2007. IEEE International Symposium on; Digital Object Identifier: 10.1109/ISIE.2007.4375070 Publication Year: 2007 , pp. 2876-2881.*

Simulating the Operational Control of Free Ranging AGVs; Duinkerken, M.B.; Hoeven, T.T.; Lodewijks, G.; Simulation Conference, 2006. WSC 06. Proceedings of the Winter; Digital Object Identifier: 10.1109/WSC.2006.322921 Publication Year: 2006 , pp. 1515-1522.*

Fuzzy supervision in statistical process control; Zalila, Z.; Fatene, M.; Kadhi, R.; Systems, Man, and Cybernetics, 1998. 1998 IEEE International Conference on; vol. 1; Digital Object Identifier: 10.1109/ICSMC.1998.725485; Publication Year: 1998 , pp. 638-643 vol. 1.*

Performance Evaluation for Robust Control of Spatial Disturbances in Channel Flow; O'Dea, E.; Tutty, O.R.; Rogers, E.; Decision and Control, 2005 and 2005 European Control Conference. CDC-ECC '05. 44th IEEE Conference on; Digital Object Identifier: 10.1109/CDC.2005.1582208; Publication Year: 2005 , pp. 518-523.*

A real time traffic control scheme for a multiple AGV system; Jeong-Hoon Lee; Bum Hee Lee; Myoung Hwan Choi; Jung Duk Kim; Kwang-Taek Joo; Hyon Park; Robotics and Automation, 1995. Proceedings., 1995 IEEE International Conference on vol. 2 ; Digital Object Identifier: 10.1109/ROBOT.1995.525507; Publication Year: 1995 , pp. 1625-1630 vo.*

A control system for automated multi-purpose vehicles for manufacturing applications; Peco, P.; Eklund, J.M.; Electrical and Computer Engineering, 2008. CCECE 2008. Canadian Conference on; Digital Object Identifier: 10.1109/CCECE.2008.4564899 Publication Year: 2008 , pp. 002015-002020.*

Time Windows Based Dynamic Routing in Multi-AGV Systems; Smolic-Rocak, N.; Bogdan, S.; Kovacic, Z.; Petrovic, T.; Automation Science and Engineering, IEEE Transactions on; vol. 7 , Issue: 1; Digital Object Identifier: 10.1109/TASE.2009.2016350; Publication Year: 2010 , pp. 151-155.*

Open architecture for robot controllers; Borangiu, T.; Anton, F.D.; Anton, S.; Robotics in Alpe-Adria-Danube Region (RAAD), 2010 IEEE 19th International Workshop on; Digital Object Identifier: 10.1109/RAAD.2010.5524587 Publication Year: 2010 , pp. 181-186.*

Coordination of multiple AGVs in an industrial application; Olmi, R.; Secchi, C.; Fantuzzi, C.; Robotics and Automation, 2008. ICRA 2008. IEEE International Conference on; Digital Object Identifier: 10.1109/ROBOT.2008.4543487 Publication Year: 2008 , pp. 1916-1921.*

Multiple robots localization using large planar camera array for automated guided vehicle system; Xuefeng Liang et al.; Information and Automation, 2008. ICIA 2008. International Conference on; Digital Object Identifier: 10.1109/ICINFA.2008.4608142; Publication Year: 2008 , pp. 984-990.*

Multicriteria meta-heuristics for AGV dispatching control based on computational intelligence; Naso, D.; Turchiano, B.; Systems, Man, and Cybernetics, Part B: Cybernetics, IEEE Transactions on ; vol. 35 , Issue: 2; Digital Object Identifier: 10.1109/TSMCB.2004.842249; Publication Year: 2005 , pp. 208-226.*

Petri Net decomposition approach for the simultaneous optimization of task assignment and routing with automated guided vehicles; Nishi, T. et al.; Automation Science and Engineering, 2008. CASE 2008. IEEE International Conference on; Digital Object Identifier: 10.1109/COASE.2008.4626458; Publication Year: 2008 , pp. 175-180.*

Modeling Distributed Transportation Systems Composed of Flexible Automated Guided Vehicles in Flexible Manufacturing Systems; Herrero-Perez, D.; Martinez-Barbera, H.; Industrial Informatics, IEEE Transactions on; vol. 6 , Issue: 2 Digital Object Identifier: 10.1109/TII.2009.2038691; Publication Year: 2010 , pp. 166-180.*

PCT International Search Report for International Application No. PCT/US07/61430 dated Feb. 20, 2008 (2 pages).

* cited by examiner

VARIABLE PATH AUTOMATED GUIDED VEHICLE

CROSS-REFERENCE TO RELATED APPLICATION

This application claims the benefit of U.S. Provisional Application No. 60/764,094, filed Feb. 1, 2006, the entire disclosure of the provisional application being considered part of the disclosure of this application and hereby incorporated by reference.

BACKGROUND OF THE INVENTION

The present invention is generally directed to material handling vehicles and, more particularly, to an automatic guided vehicle capable of varying its travel path in order to reduce wear patterns created in the floor of the material handling facility.

Material handling vehicles which are not automated may include, for example, a fork lift truck operated by a person to transport material in a facility from one location to another. Such non-automated material handling vehicles while traveling the same route do not follow an identical travel path when transporting materials, due to human error and variances between operators.

Automatic guided vehicles (AGVs) are increasingly used throughout the material handling industry in place of non-automated vehicles to transport loads. AGVs transport material along predetermined routes that are detected or sensed by the AGVs. These routes may be sensed through electromagnetic, optical, or other systems. The loads transported by the AGVs may vary in size and AGVs are particularly suited for transporting very heavy loads, such as huge steel coils along a predetermined guide path.

AGVs generally include frames for mounting the load, wheels and a guidance system. The term AGV is commonly used to refer to robust vehicle designs having any of a number of available automated guidance systems. Automatic guided carts (AGCs) is a term commonly used to refer to a vehicle used for similar but less complicated applications. Throughout this application, including the claims, the term automatic guided vehicle or AGV shall mean and include both AGV's and AGC's, as well as any other vehicle that is automatically guided.

AGVs have various designs but generally include a frame with wheels located proximate the four corners of the frame, a means of propulsion and means for directing the cart. Some AGVs include swivel castors located proximate to the corners of the frame and include a separate drive wheel assembly and rigid castors for directional control of the cart. Some AGV designs include two rigid castors fixed to the frame and located approximately midway between the swivel castors on each side of the cart frame. Other AGVs include a drive assembly that has a fixed drive wheel to propel the AGV and a steerable castor wheel to direct the movement of the AGV.

Automated guided vehicle systems include a guidance system which is commonly located on the AGV. Typical guidance systems include wire guidance, laser guidance, magnetic tape guidance, odometry guidance, inertial guidance, optical guidance, and positioning guidance such as gps. These guidance systems are typically capable of controlling AGV speed, direction, start/stop functions and, in some cases, the loading and unloading of the material and other operations at various workstations. The guidance systems may also be used to control an AGVs movement relative to other AGVs, obstacles or even people in or along the desired route.

One problem with the use of an AGV, instead of a non-automated vehicle operated by a person, arises from the repeated traveling of the same route, resulting in wear patterns in the floor of the facility where the AGV operates. Since the AGV is programmed to repeatedly follow a predetermined route, significant wear patterns develop in the floor of the facility over time. Such wear can cause floor erosion and wear patterns that may cause the AGV to inadvertently be misguided from the guide path or create difficulty in the AGV deviating from the predetermined route to avoid an obstacle. In some cases, where the load being carried by the AGV is heavy and the frequency of usage is great, these wear patterns can cause significant damage to the floor of the facility such as grooves, ruts, potholes, and pitting of the floor.

SUMMARY OF THE INVENTION

In view of the above, a need exists for an AGV that can efficiently transport material on a predetermined route while minimizing wear on the facility, and more particularly to an AGV that automatically varies the actual travel path from the predetermined route to reduce wear in the floor of the material handling facility.

To meet these and other needs that will be apparent to those skilled in the art based upon this description and the appended drawings, the present invention is directed to a method and to an AGV designed to automatically vary the travel path to reduce wear in the floor of the material handling facility. The method includes a guidance system controlling the steering and the drive mechanism to direct the AGV along a varying travel path. The guidance system collects data from a detection system relating to the position of the vehicle relative to the predetermined route and applies a deviation factor from the predetermined route to intentionally direct the AGV along a travel path that is not identical to the predetermined route. With the deviation factor applied, the travel path of the AGV generally follows the predetermined route but does not identically match the predetermined route.

The AGV of the present invention includes a guidance system having a detection system for detecting data relative to a desired route for the AGV and a controller for storing the position data and calculating a travel path having at least a portion thereof different from the predetermined route.

Further scope and applicability of the present invention will become apparent from the following detailed description, claims and drawings. However, it should be understood that the specific examples in the detailed description are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The present invention is directed to an apparatus and method for guiding an automated guided vehicle (AGV) along a variable travel path to reduce wear patterns in the floor of a material handling facility.

Figure 1:
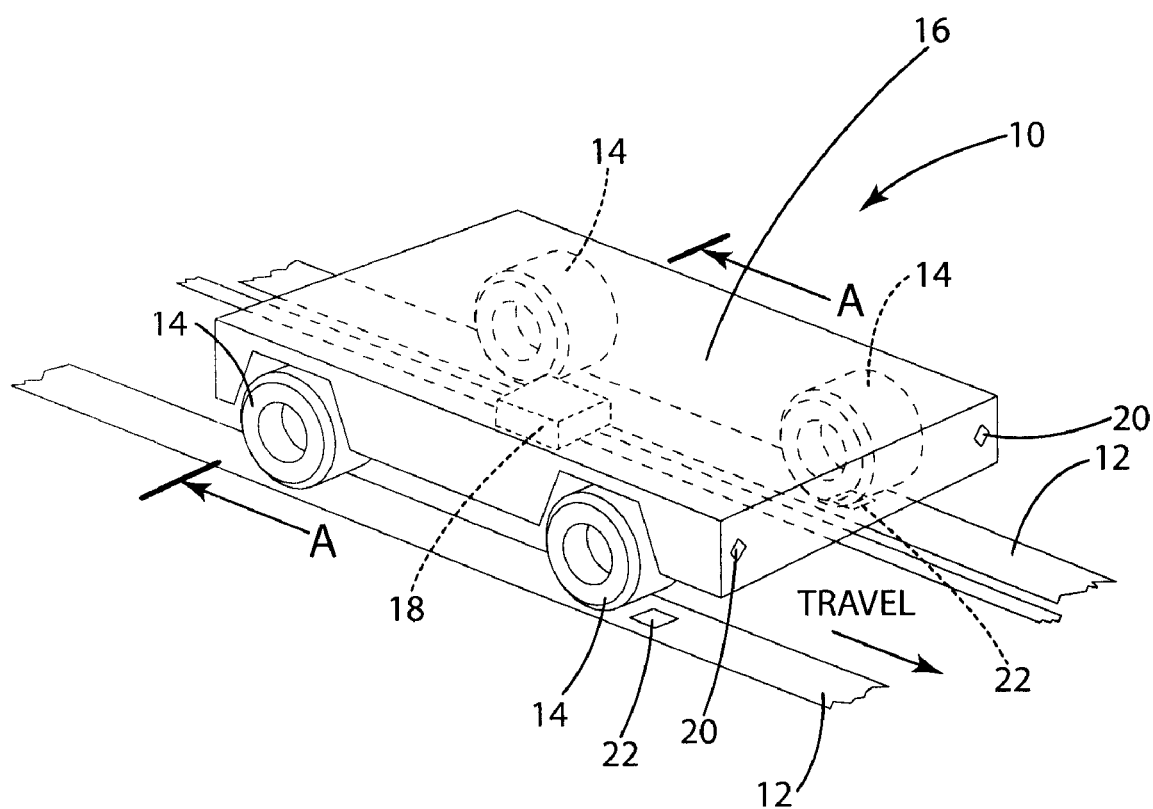
FIG. 1 is a perspective view of an AGV positioned in operative alignment on a pathway with a magnetic marker on a floor of a material handling facility.

An AGV is generally shown at 10 in FIG. 1 following a predetermined route 12 in the floor of a material handling facility. In this example, the AGV 10 includes wheels 14 for traveling along the predetermined route 12 and a frame 16 for receiving a load (not shown). It should be appreciated that the present invention is not limited to an AGV with four wheels but may also include any number of other wheel configurations including, for example, three wheels with one drive wheel and one steering wheel. The frame 16 of the AGV 10 includes a controller 18 for use in connection with a detection system. The frame 16 may incorporate many different features and is not meant to be limited to a flat bed, for example, the frame 16 may include a fork lift mechanism for use with a skid.

In the present invention, the guidance system for the AGV 10 includes a controller 18 and a detection system including a pair of exemplary sensors 20 for sensing and tracking a magnetic field generated by current passing through a guide wire 22 buried in the floor. The detection system senses data relating to the position of the AGV 10 and sends such data to the controller 18. In should be appreciated that although in this example, the detection system includes the use of sensors and a magnetic field, the present invention may use any known guide system, including, for example, an inertial guidance system using wheel encoders and gyroscopes. Other examples of guidance systems include U.S. Pat. No. 4,990,841, issued Feb. 5, 1991 and entitled "Magnetically Guided Vehicle," and U.S. Pat. No. 5,434,781, issued Jul. 18, 1995 and entitled "Method And Apparatus For Guiding A Driverless Vehicle Using A Sensor Tracking A Cable Emitting An Electromagnetic Field."

Figure 2:
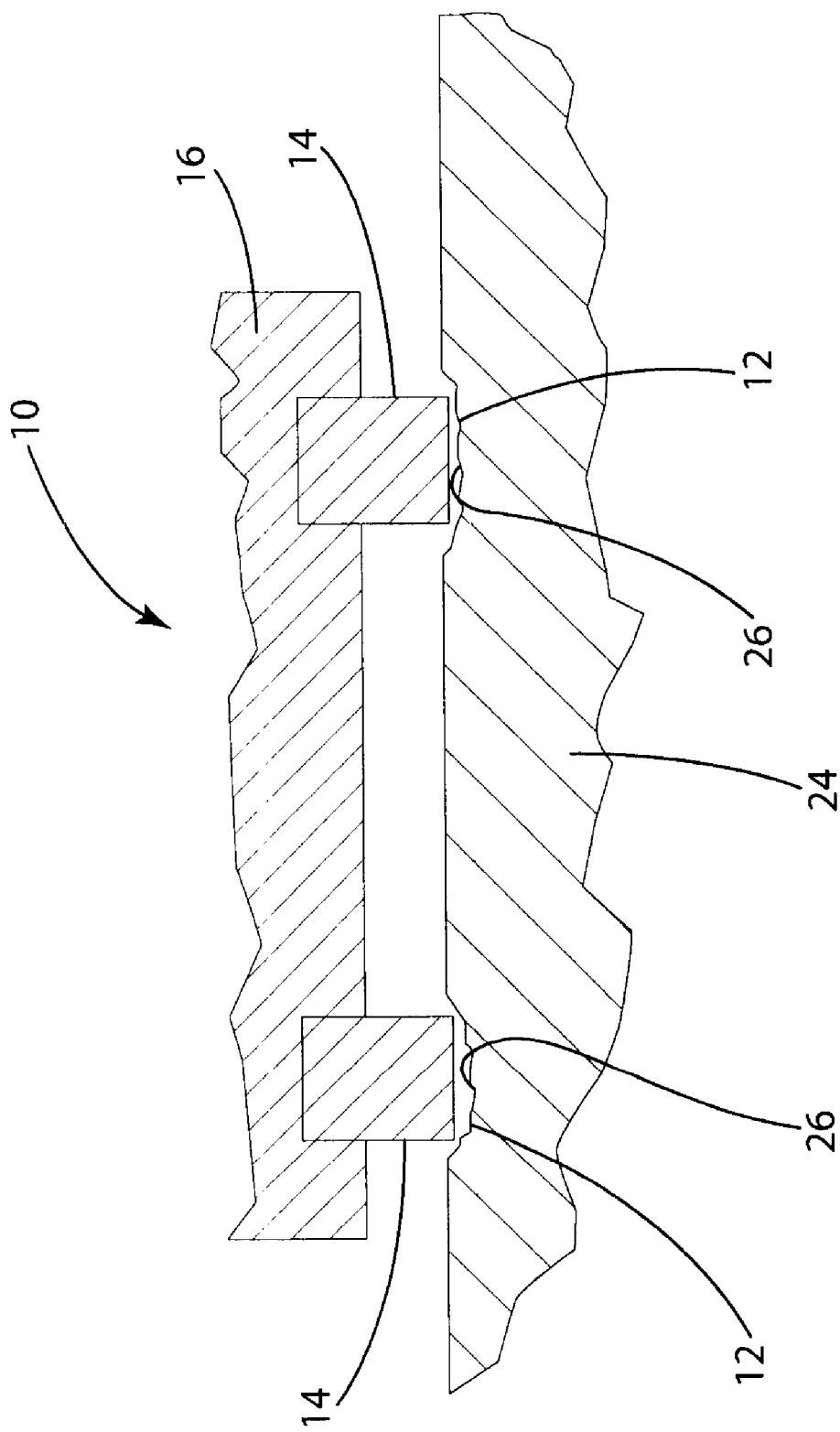
FIG. 2 is a sectional view along line A-A in FIG. 1 of an AGV positioned on a pathway.

FIG. 2 shows the AGV 10 having the frame 16 and wheels 14 following the predetermined route 12 in the floor 24 of the material handling facility. As described above, due to the frequency of the AGV following the same travel path and the weight of the loads carried by the AGV, wear patterns 26 develop in the floor 24.

In this example, the controller 18 is located on-board the AGV 10; however, it is possible that an additional controller (not shown) located centrally to the entire travel path 12 and not on-board the AGV 10 may be used in connection with the controller 18 on the AGV 10. The controller 18 is used to control the travel path of the AGV 10 relative to the predetermined route 12. In general, the controller 18 is programmed to compare data received from the guidance system relating to the position of the AGV 10 against reference data input into the controller 18 or received by the guidance system. In prior art systems, a controller is used to keep the AGV 10 on a travel path that is as identical as possible to the predetermined route by measuring the difference between the reference data and the data received from the guidance system and constantly correcting the travel path to identically match the predetermined route. In the present invention, an algorithm is used or additional reference data is input into the controller 18 to cause the AGV 10 to follow a travel path that is offset or varied from the predetermined route. The variance or deviation from the predetermined route may be random, specific, or a combination thereof. For example, the controller 18 may be programmed to randomly vary the travel path from the predetermined route so that each time the predetermined path is followed, the travel path of the AGV along the predetermined route is randomly selected. The controller 18 may also be programmed so that each controller 18 on each AGV will apply a slightly different variation or deviation. This example, while each AGV will follow a different travel path along the predetermined route 12, it is possible that each time a particular AGV follows a predetermined route, it follows a substantially similar travel path which in a system with a plurality of AGVs would still substantially reduce the wear on the facility floor. The controller 18 may also vary only portions along the predetermined route 12 to create various travel paths and a minor variation of a small portion may affect the complete subsequent travel path of the AGV.

Figure 3:
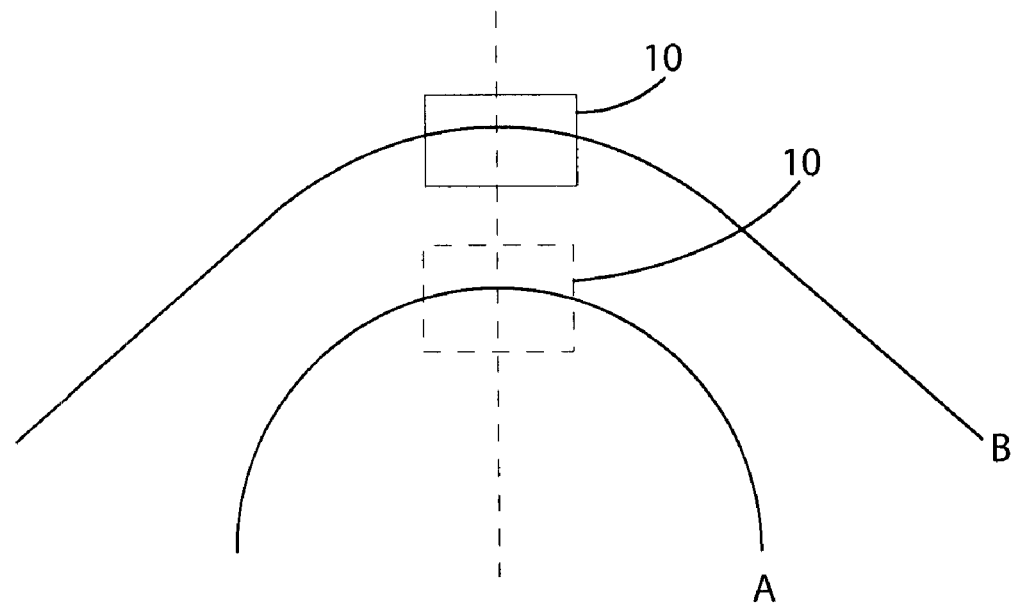
FIG. 3 is a plan view of various pathways along which an AGV may be guided according to the present invention.
Figure 4:
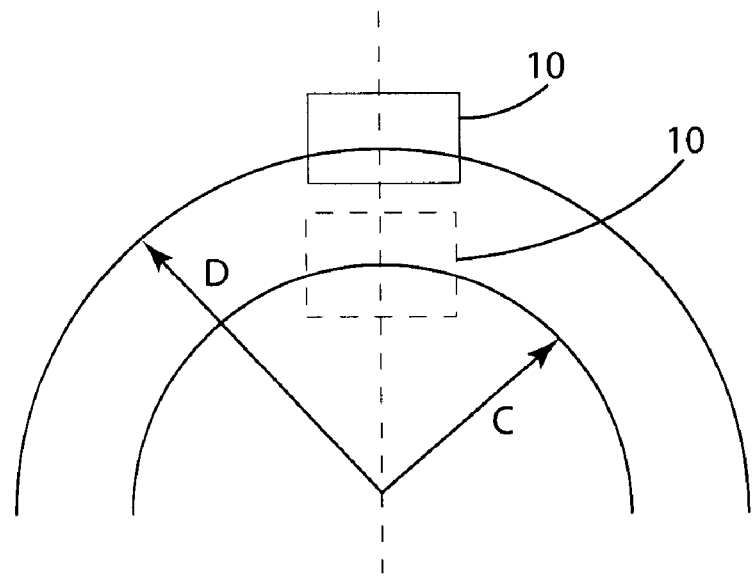
FIG. 4 is a plan view of various pathways along which an AGV may be guided according to the present invention.

In the present invention, the controller 18 is programmed to vary the travel path 12 of the AGV 10 in any number of different circumstances. For example, as seen in FIG. 3, the AGV 10 of the present invention may be programmed to vary a simple turn from a turn A to a turn B in order to reduce wear in the floor 24 proximate the required turn of the AGV. By varying the radius in the turn even minutely or the distance of the turn, all future travel paths may be substantially changed from the predetermined route 12. As another example, as seen in FIG. 4, the AGV 10 of the present invention may be programmed to vary the turn radius from radius C to radius D.

The controller 18 may also be programmed to vary the travel path of the AGV 10 based on information relating to the frequency of other AGVs 10 traveling along a predetermined route. For example, the travel path may be varied by the controller 18 wherein the controller 18 is programmed to calculate frequency rates of other AGVs having traversed a path. The controller 18 may also log each variance and use a different variance for each subsequent travel path along a predetermined route. Typically, a limit will be set on the amount of variance from the predetermined route. For example, in areas with little interaction with people or having a high frequency of AGVs traveling along a particular route, the AGVs may use a greater variance from the predetermined route than along a predetermined route that is adjacent to a walkway for people. The variance from the predetermined route can easily be limited by limiting the applied deviation, by measuring the desired distance from the predetermined route and correcting when the distance becomes too great for a particular area, or a combination thereof. The deviation applied may include the application of multiple minor deviations along the predetermined route to vary the travel path of the AGV from such predetermined route.

Figure 5:
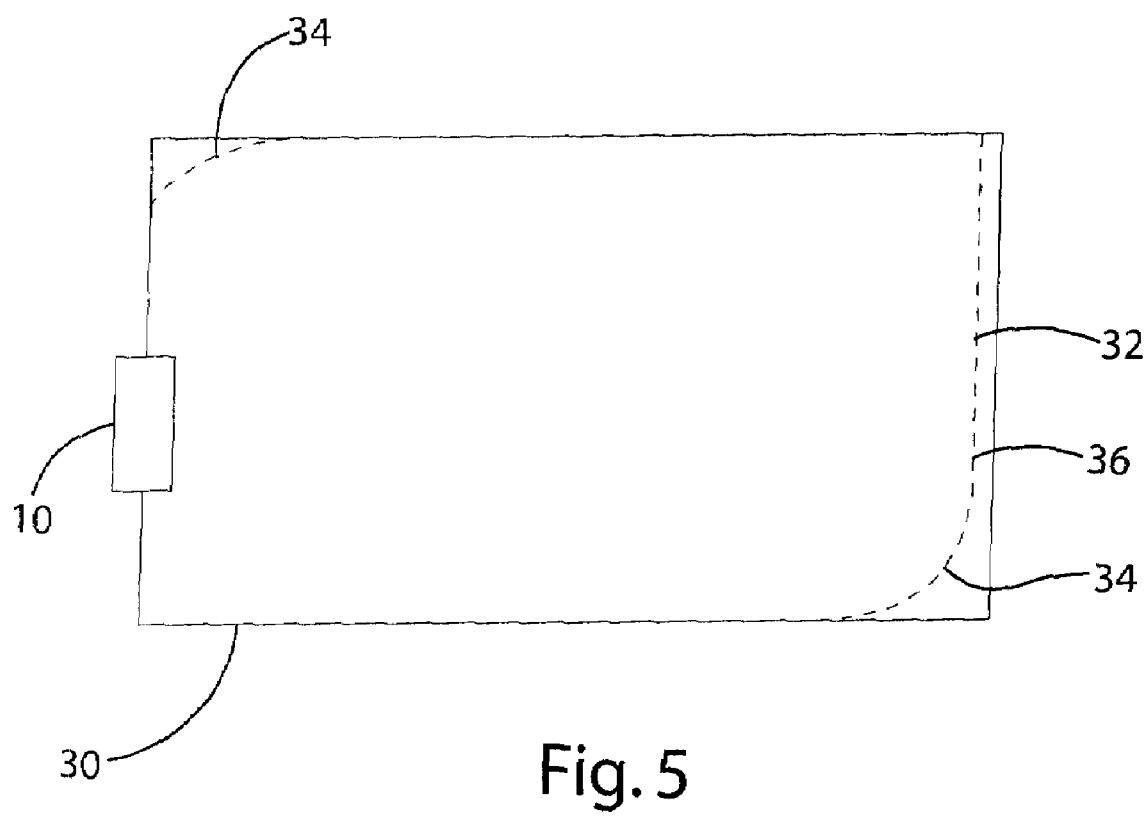
FIG. 5 is a plan view of a simple loop along which an AGV according to the present invention may use various pathways.
Figure 6:
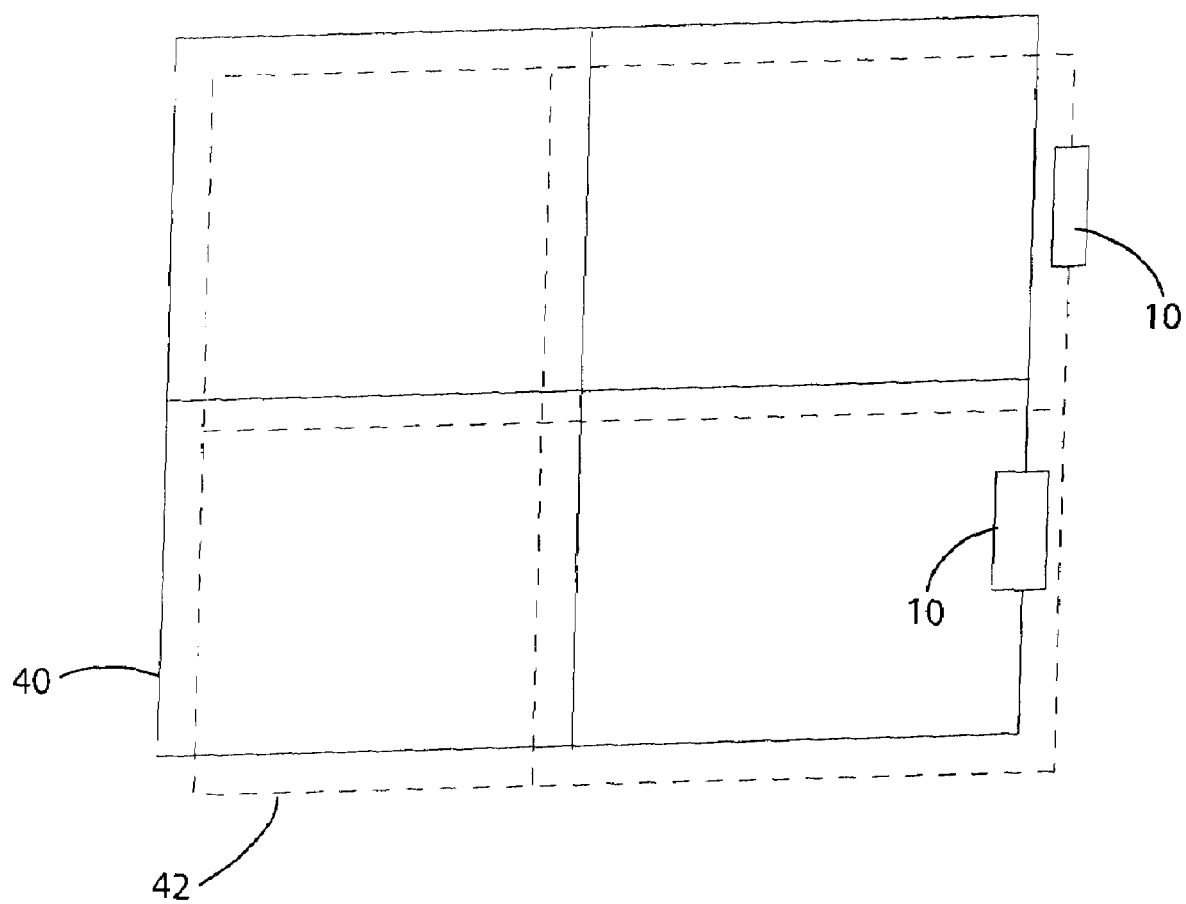
FIG. 6 is a plan view of a complex loop along which an AGV according to the present invention may use various pathways.
Figure 7:
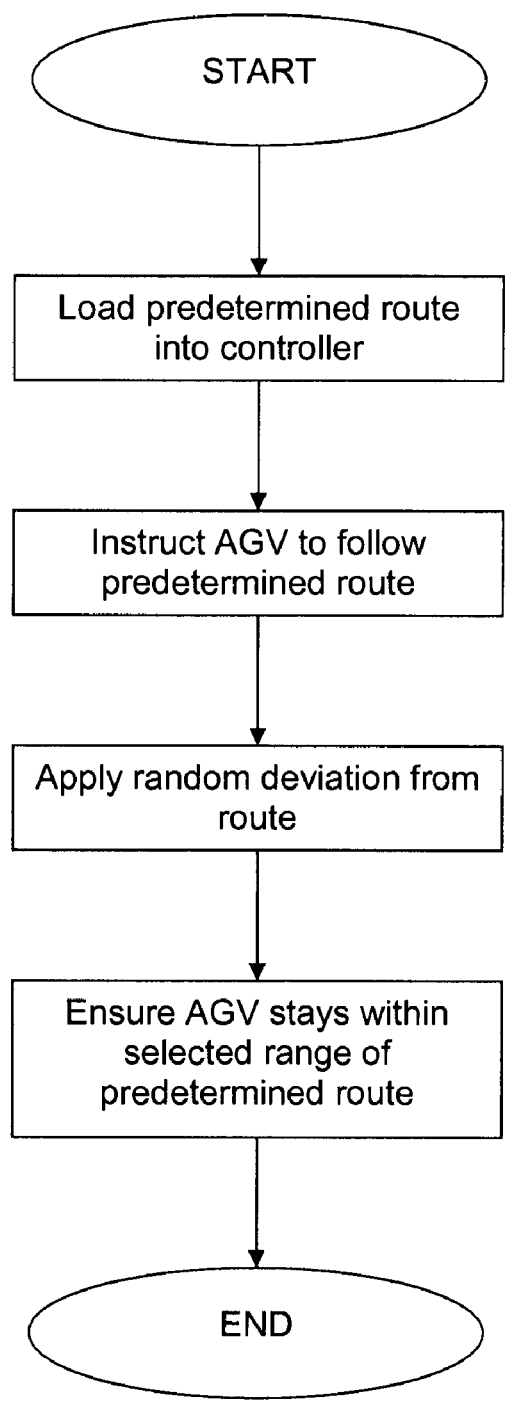
FIG. 7 is a first exemplary flow chart of the invention.
Figure 8:
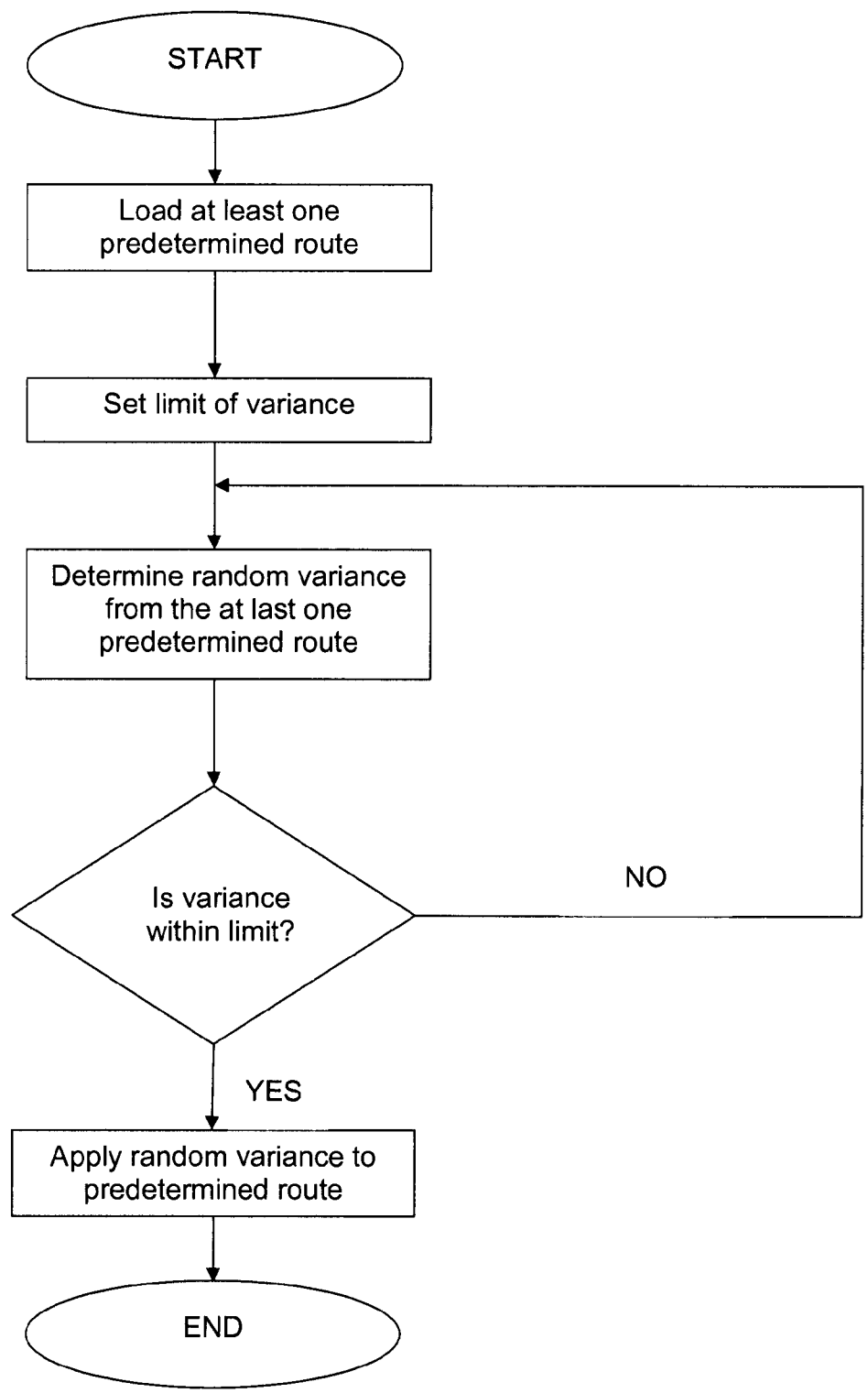
FIG. 8 is a second exemplary flow chart of the invention.

In operation, as shown in FIGS. 5 and 6, the controller 18 is programmed to cause the AGV 10 to vary its travel path 12 in order to reduce wear patterns in the floor of the material handling facility. FIG. 5 shows an AGV 10 following a first travel path 30 of a simple travel route configured to be a rectangle with right angle turns, and a second travel path 32 configured to utilize many portions of the first travel path 30; however, with some portions varied from the first travel path. In this example, two of the turns are changed from right angles to arcuate turns 34 and one straight portion 36 is offset from the first travel path 30. As another example, FIG. 6 shows an AGV 10 following a first travel path 40 of a more complex travel route configured like a square with four quadrants with right angle turns. In this example shown in FIG. 6, the controller 18 is programmed to cause the AGV 10 to take a second path 42 having the same shape as the first path 40 but having the entire path offset from the first path 30.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of controlling a plurality of automated guided vehicles (AGVs) between stations along predetermined routes, said method comprising:
   instructing a first AGV to follow a predetermined route along a travel surface to a destination station;
   instructing the first AGV to apply a first deviation to the travel path of the first AGV so that the travel path of the first AGV does not match the predetermined route;
   instructing a second AGV to follow said predetermined route along said travel surface to said destination station; and
   instructing the second AGV to apply a second deviation to the travel path of the second AGV so that the travel path of the second AGV does not match the travel path of the first AGV.

2. The method of claim 1 further including a step of setting a limit to said applied deviation.

3. The method of claim 1 wherein said applied deviations include deviations in a turning radius of a vehicle, deviations in the distance traveled before performing a directional control operation with the AGV, an offset distance from the predetermined route, angling of the travel path relative to the predetermined route, or combinations of the above.

4. The method of claim 1 wherein said step of applying a deviation includes applying multiple minor deviations along the predetermined route to vary the travel path from the predetermined route.

5. The method of claim 1 further including the step of correcting the travel path if the AGV is displaced from the predetermined route by a greater than allowed range.

6. The method of claim 1 further including the step of matching the travel path to the predetermined route before the AGV reaches the station.

* * * * *